United States Patent
Chen et al.

(10) Patent No.: US 7,443,816 B2
(45) Date of Patent: Oct. 28, 2008

(54) PACKET TRANSMISSION METHOD, BASE STATION AND MOBILE STATION

(75) Inventors: Lan Chen, Yokohama (JP); Narumi Umeda, Yokohama (JP); Yasushi Yamao, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 939 days.

(21) Appl. No.: 10/170,439

(22) Filed: Jun. 14, 2002

(65) Prior Publication Data

US 2002/0191559 A1    Dec. 19, 2002

(30) Foreign Application Priority Data

Jun. 18, 2001    (JP)    ............... 2001-183393

(51) Int. Cl.
*H04Q 7/20*    (2006.01)
*H04J 3/16*    (2006.01)
*H04B 7/216*    (2006.01)

(52) U.S. Cl. ............... 370/329; 370/465; 455/450

(58) Field of Classification Search ............... 370/235, 370/252, 335, 441, 395.21, 468, 236, 329, 370/465, 470; 455/450
See application file for complete search history.

(56) References Cited

U.S. PATENT DOCUMENTS

| 7,221,648 | B2* | 5/2007 | Das et al. ............... 370/231 |
| 2004/0081115 | A1* | 4/2004 | Para et al. ............... 370/320 |
| 2004/0160923 | A1* | 8/2004 | Nobukiyo et al. ............... 370/335 |
| 2005/0141463 | A1* | 6/2005 | Ando ............... 370/335 |
| 2005/0271028 | A1* | 12/2005 | Proctor, Jr. ............... 370/345 |

FOREIGN PATENT DOCUMENTS

| JP | 2000-217159 | 8/2000 |
| JP | 2001-16276 | 1/2001 |
| KR | 2001-0026923 | 4/2001 |
| WO | WO 99/52307 | 10/1999 |
| WO | WO 00/28760 | 5/2000 |
| WO | WO 00/76244 | 12/2000 |
| WO | WO 01/15475 | 3/2001 |

\* cited by examiner

*Primary Examiner*—Aung S. Moe
*Assistant Examiner*—Feben M Haile
(74) *Attorney, Agent, or Firm*—Oblon, Spivak, McClelland, Maier & Neustadt, P.C.

(57) ABSTRACT

A packet transmission method in which packets are transmitted between a base station and a mobile station communicating with the base station includes the steps of: recognizing the size of each of the packets to be transmitted; determining a transmission rate for each packet in accordance with the recognized size of the packet; allocating a radio resource to the transmission of each packet between the base station and the mobile station based on the determined transmission rate; and transmitting each packet between the base station and the mobile station using the allocated radio resource. In the method, a modulation method or a radio resource used for transmitting the packets is determined by calculating a transmission rate in a wireless area according to the size of each packet and a transmission request in the wireless area. The transmission request is recognized by the base station from an upper network when the packets are transmitted downward, while calculated by the base station based on a user request and a transmission state of the upper network when the packets are transmitted upward. Therefore, end-to-end quality of service can be provided.

26 Claims, 12 Drawing Sheets

FIG. 4

| PACKET SIZE (byte) | TRANSMISSION RATE (kbps) |
|---|---|
| 1~100 | 64 |
| 101~500 | 128 |
| 501~1000 | 256 |
| 1001~1500 | 384 |

PACKET TRANSMISSION METHOD, BASE STATION AND MOBILE STATION

BACKGROUND OF THE INVENTION

1. Field of the Invention

The present invention relates to a packet transmission method in which packets are transmitted between a base station and a mobile station communicating with the base station when the packets are transmitted from a sender to a receiver, and to a base station and a mobile station to which the packet transmission method is applied.

2. Description of the Related Art

As multimedia service makes progress in these years, in addition to the conventional voice communication, non-voice communication such as image communication is being performed. In many cases, the size of each packet transmitted in the non-voice communication differs depending on an application used for processing the packet and the type of the packet (for example, types such as a control packet, an information packet, and the like). More specifically, the size of a packet varies widely from several bytes of the control packet to 1500 bytes prescribed by MTU.

As mentioned above, various sizes of packets are transmitted. However, there is a demand for reducing variation of packet transmission time when transmitting packets each having a different size from a sender to a receiver.

For example, take a case where moving image data transmitted from a sender are reproduced by a receiver by streaming playback. in this case, the size of a packet including the moving image data varies according to variations of the images. However, it is necessary to reduce variation of packet transmission time when transmitting packets each having a different size in order to smoothly reproduce the moving image data at the receiver.

In addition, conventionally, in a system where a sender and a receiver communicate each other through a plurality of networks, there is a demand for satisfying transmission quality from the sender to the receiver, that is, end-to-end transmission quality.

However, conventionally, it is difficult to reduce variation of packet transmission time when transmitting packets each having a different size from a sender to a receiver.

For example, in Japanese Laid-Open Patent Application No. 2001-016276 "Communication Equipment, Communication Method, Storage Medium and Communication System", a method is proposed in which packets in a buffer holding a small amount of data are transmitted at low speed, while packets in a buffer holding a large amount of data are transmitted at high speed so as to make the transmission rate variable. In other words, transmission time in transmitting packets is adjusted.

However, in a case where packets having large sizes are held in a buffer holding a small amount of data, the packets thereof are transmitted at low speed. On the other hand, in a case where packets having small sizes are held in a buffer holding a large amount of data, the packets thereof are transmitted at high speed. Accordingly, variation of packet transmission time becomes greater.

Additionally, conventionally, in a system communicating with a plurality of networks, a transmission rate is determined for each of the networks according to a predetermined priority. Thus, in many cases, transmission quality is not satisfied even when it is required to satisfy transmission quality from a sender to a receiver, that is, end-to-end transmission quality.

SUMMARY OF THE INVENTION

It is a general object of the present invention to provide a novel and useful packet transmission method, a base station and a mobile station, in which the problems described above are eliminated.

A more specific object of the present invention is to provide a packet transmission method, a base station and a mobile station that can reduce variations of packet transmission time and can guarantee transmission quality from a sender to a receiver when transmitting packets having different sizes from the sender to the receiver.

In order to achieve the above-mentioned objects, there is provided according to one aspect of the present invention, a packet transmission method in which a packet is transmitted between a base station and a mobile station communicating with the base station, including the steps of: recognizing the size of the packet to be transmitted; determining a transmission rate for the packet between the base station and the mobile station in accordance with the recognized size of the packet; allocating a radio resource to transmission of the packet between the base station and the mobile station based on the determined transmission rate; and transmitting the packet between the base station and the mobile station using the allocated radio resource.

According to the above-mentioned aspect of the present invention, the packet transmission rate between the base station and the mobile station is determined in accordance with the size of the packet to be transmitted. Thus, it is possible to reduce variation of packet transmission time from a sender to a receiver when the transmission rate is determined such that the transmission rate is higher as the size of a packet becomes larger.

Additionally, according to another aspect of the present invention, in the above-mentioned packet transmission method, when the packets are transmitted from the mobile station as a sender to a receiver, the transmission rate may be determined based on the size of the packet to be transmitted and the transmission state of an upper network of the base station so as to satisfy a transmission condition between the mobile station and the receiver.

Additionally, according to another aspect of the present invention, in the above-mentioned packet transmission method, when packets are transmitted downward, the base station recognizes the transmission request in the wireless area from the upper network. When packets are transmitted upward, the base station calculates the transmission request in the wireless area based on a request from a user (mobile station) and a transmission state of the upper network.

Thus, when packets are transmitted downward, the optimum transmission rate is determined in accordance with the size of each packet and the transmission request in the wireless area from the upper network. When packets are transmitted upward, the transmission request in the wireless area is calculated in accordance with the quality of service request of the user and the transmission state of the upper network. Accordingly, it is possible to improve the system capacity and to maximize end-to-end quality of service by setting an optimum transmission rate.

According to the above-mentioned aspect of the present invention, the transmission rate is determined by giving consideration to the transmission state of the upper network of the base station as well as the size of the packet to be transmitted. Thus, it is possible to more positively reduce variation of packet transmission time from the sender to the receiver. Furthermore, the transmission rate is determined so as to satisfy the transmission condition from the mobile station that is the sender to the receiver. Accordingly, when high transmission quality between the sender to the receiver, that is, end-to-end transmission quality is required, it is possible to meet the requirement.

Additionally, according to another aspect of the present invention, there is provided a base station that transmits a packet between the base station and a mobile station communicating with the base station including: a packet size recognition part that recognizes the size of the packet to be transmitted; a transmission rate determination part that determines a transmission rate between the base station and the mobile station in accordance with the recognized size of the packet; a radio resource allocation part that allocates a radio resource to transmission of the packet between the base station and the mobile station based on the determined transmission rate; and a packet transmission part that transmits the packet between the base station and the mobile station using the allocated radio resource.

According to the above-mentioned aspect of the present invention, the transmission rate between the base station and the mobile station is determined in accordance with the size of the packet to be transmitted. Thus, it is possible to reduce the variation of packet transmission time from the sender to the receiver when the transmission rate is determined such that the transmission rate becomes greater as the size of a packet becomes larger.

Additionally, according to another aspect of the present invention, there is provided a mobile station that transmits a packet between the mobile station and a base station including: a packet size recognition part that recognizes the size of the packet to be transmitted; a transmission rate determination part that determines a transmission rate of the packet between the mobile station and the base station in accordance with the recognized size of the packet; a transmission rate notification part that notifies the base station of the determined transmission rate; and a packet transmission part that transmits the packet between the mobile station and the base station using a radio resource allocated by the base station based on the notified transmission rate.

According to the above-mentioned aspect of the present invention, the transmission rate between the base station and the mobile station is determined in accordance with the size of a packet to be transmitted. Thus, it is possible to reduce variation of packet transmission time from the sender to the receiver when the transmission time is determined such that the transmission rate becomes greater asthe size of a packet becomes larger.

Additionally, according to another aspect of the present invention, there is provided a mobile station that transmits a packet between the mobile station and a base station including: a packet size recognition part that recognizes the size of the packet to be transmitted; a packet size notification part that notifies the base station of the recognized size of the packet; and a packet transmission part that transmits the packet between the mobile station and the base station using a radio resource allocated by the base station based on a transmission rate determined in accordance with the size of the packet.

According to the above-mentioned aspect of the present invention, the transmission rate between the base station and the mobile station is determined in accordance with the size of the packet to be transmitted. Therefore, it is possible to reduce the variation of packet transmission time from the sender to the receiver when the transmission rate is determined so as to be in proportion to the size of a packet.

Other objects, features and advantages of the present invention will become more apparent from the following detailed description when read in conjunction with the following drawings.

BRIEF DESCRIPTION OF THE DRAWINGS

FIG. 4 is a table showing a relationship between the size of a packet and a transmission rate;

DETAILED DESCRIPTION OF THE PREFERRED EMBODIMENTS

Figure 1:
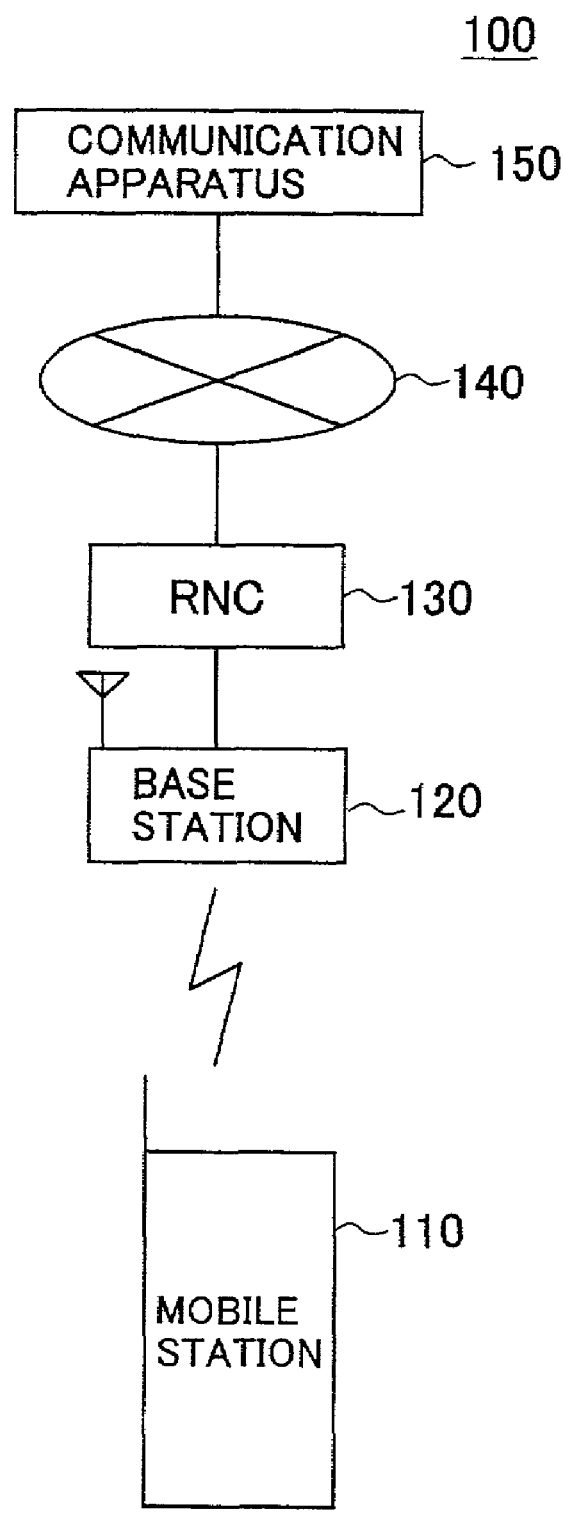
FIG. 1 is a block diagram showing an example of the structure of a mobile communication system.

In the following, a description will be given of embodiments of the present invention, with reference to the drawings. FIG. 1 is a schematic diagram showing an example of the structure of a mobile communication system 100 to which the present invention is applied. The mobile communication system 100 includes a mobile terminal 110 asa mobile station, a base station 120, a radio control apparatus (RNC) 130, a communication network 140, and a communication apparatus 150.

In the mobile communication system 100, when packet transmission is performed between the mobile terminal 110 and the communication apparatus 150, packet transmission is performed between the mobile terminal 110 and the base station 120 so that variation of transmission time from receiver to sender becomes small.

First, a description will be given of a first embodiment of the present invention. In the first embodiment, a transmission speed (transmission rate) between the mobile terminal 110 and the base station 120 is determined based on only the size of packet to be transmitted.

Figure 2:
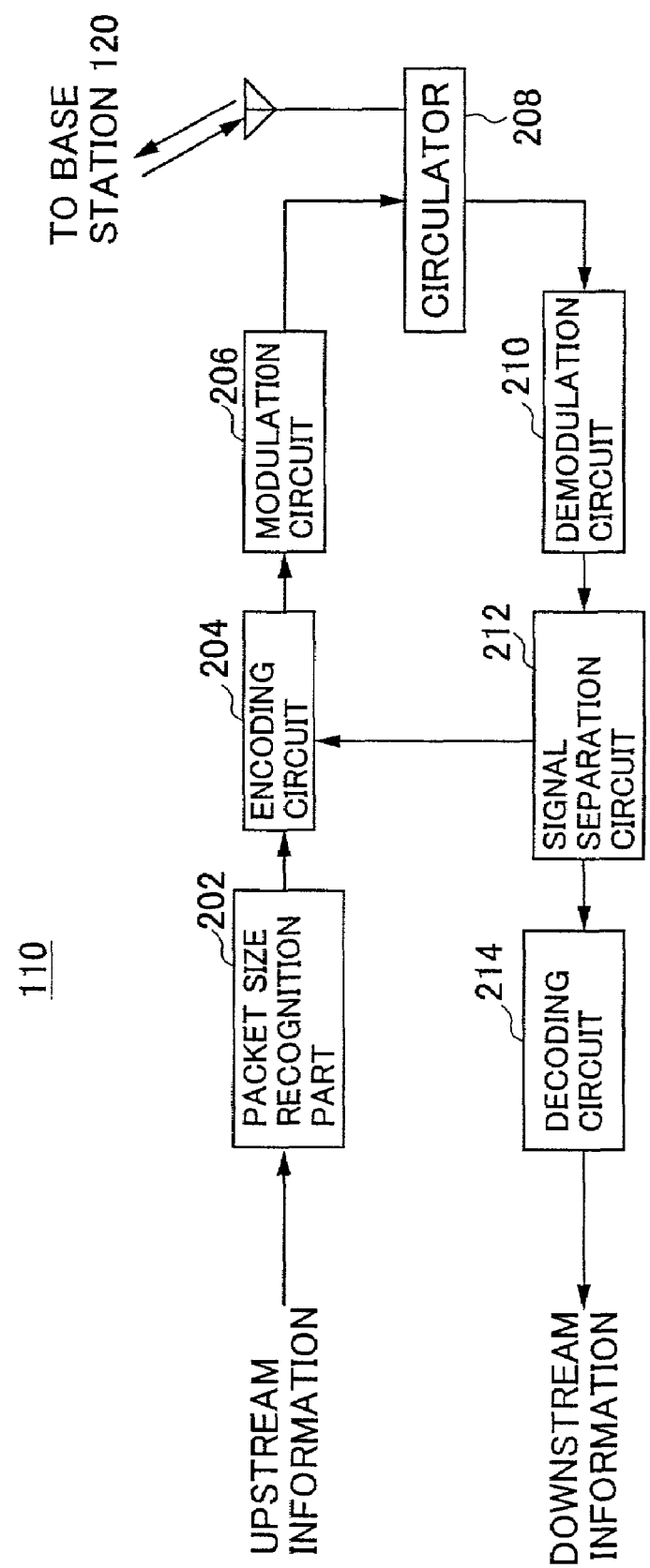
FIG. 2 is a block diagram showing an example of the structure of a mobile terminal in a reservation type access system according to a first embodiment of the present invention.

FIG. 2 illustrates an example of the structure of the mobile terminal 110 in a reservation type access system according to the first embodiment of the present invention. As shown in FIG. 2, the mobile terminal 110 in the reservation type access system includes a packet size recognition part 202, an encoding circuit 204, a modulation circuit 206, a circulator 208, a demodulation circuit 210, a signal separation circuit 212, and a decoding circuit 214.

Figure 3:
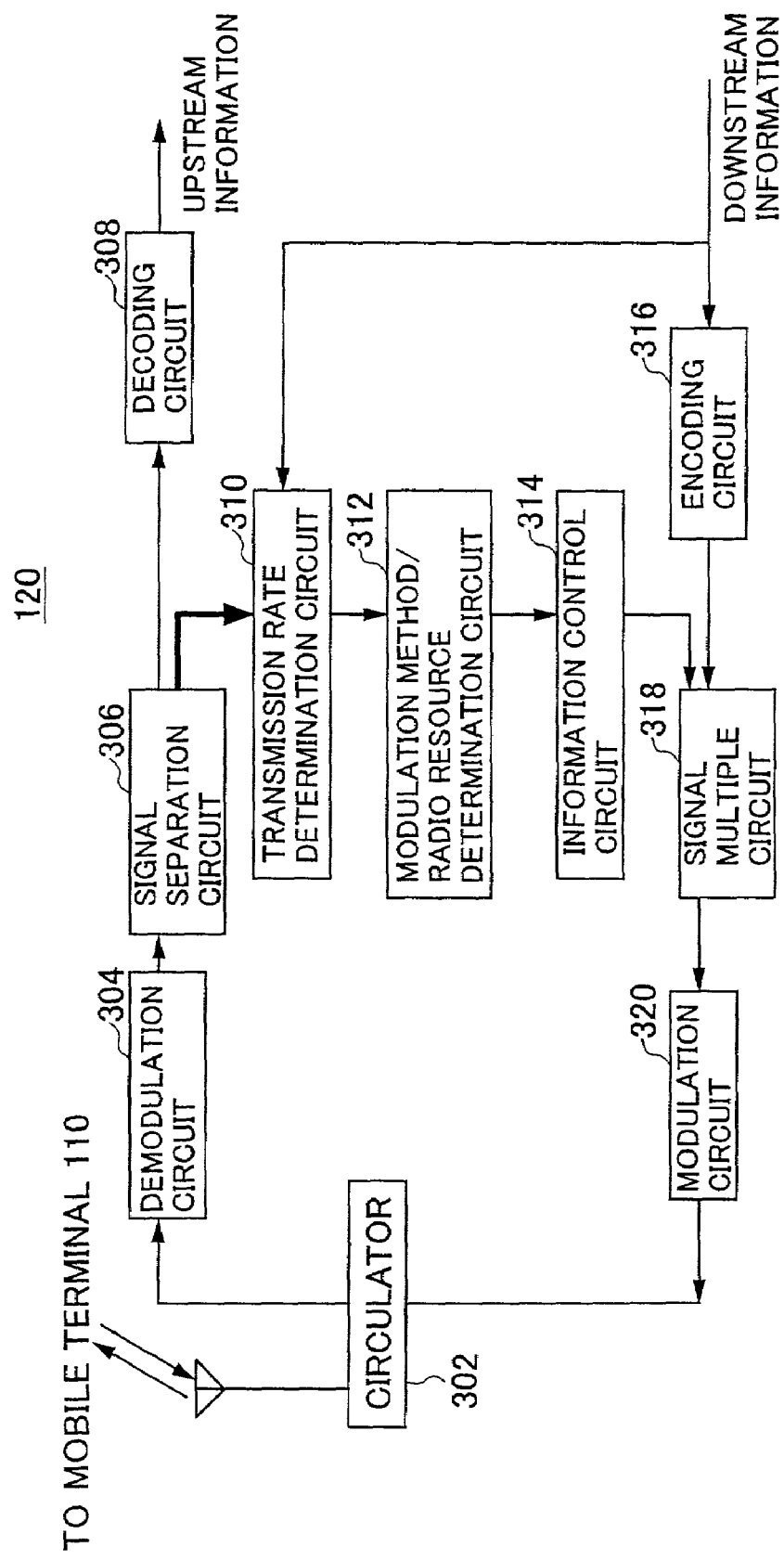
FIG. 3 is a block diagram showing an example of the structure of a base station in the reservation type access system according to the first embodiment.

Additionally, FIG. 3 illustrates an example of the structure of the base station 120 in the reservation type access system according to the first embodiment of the present invention. As shown in FIG. 3, the base station 120 in the reservation type access system includes a circulator 302, a demodulation circuit 304, a signal separation circuit 306, a decoding circuit 308, a transmission rate determination circuit 310, a modulation method/radio resource determination circuit 312 (referred to as "determination circuit 312", hereinafter), an information control circuit 314, an encoding circuit 316, a signal multiple circuit 318, and a modulation circuit 320.

In the reservation type access system, when transmitting packets from the mobile terminal 110 to the communication apparatus 150, the mobile terminal 110 transmits a transmission request and the size of each of the packets to be transmitted to the base station 120.

More specifically, the packet size recognition part 202 of the mobile terminal 110 shown in FIG. 2 recognizes the size of each of the packets to be transmitted. The size of the packet is transmitted to the base station 120 with the transmission request via the encoding circuit 204, the modulation circuit 206 and the circulator 208.

The size of the packet and the transmission request transmitted from the mobile terminal 110 are input to the transmission rate determination circuit 310 via the circulator 302, the demodulation circuit 304 and the signal separation circuit 306 that are in the base station 120.

The transmission rate determination circuit 310 determines a transmission rate for each packet between the mobile terminal 110 and the base station 120 based on the size of the packet that is input. To be specific, as shown in FIG. 4, the transmission rate determination circuit 310 determines a transmission rate such that the transmission rate is higher as the size of the packet becomes larger.

The determination circuit 312 determines a modulation method and a radio resource in accordance with the transmission rate that is determined by the transmission rate determination circuit 310. More specifically, the determination circuit 312 determines the modulation method such as transmission power, and at the same time, a spread code that is a radio resource in accordance with the determined transmission rate when the CDMA system is employed in multiplexing. Additionally, the determination circuit 312 determines a time slot that is a radio resource in accordance with the determined transmission rate when the TDMA system is employed in multiplexing. Further, the determination circuit 312 determines a frequency band that is a radio resource in accordance with the determined transmission rate when the FDMA system is employed in multiplexing.

Information about the determined radio resource and modulation method is transmitted to the mobile terminal 110 via the information control circuit 314, the signal multiple circuit 318, the modulation circuit 320, and the circulator 302.

At the mobile terminal 110, the information about the radio resource and modulation method that is determined by the base station 120 is input to the encoding circuit 204 via the circulator 208, the demodulation circuit 210, and the signal separation circuit 212. Thereafter, the modulation circuit 206 modulates the packets to be transmitted using the corresponding radio resources and modulation methods determined by the base station 120. The modulated packets are transmitted to the base station 120 via the circulator 208.

The packets that are to be transmitted and are transmitted from the mobile terminal 110 are input to the decoding circuit 308 via the circulator 302, the demodulation circuit 304, and the signal separation circuit 306 as shown in FIG. 3. The decoding circuit 308 decodes the packets that are input to the decoding circuit 308. The decoded packets are transmitted as upstream information to the communication apparatus 150 that is a receiver via the RNC 130 and the communication network 140.

Figure 5:
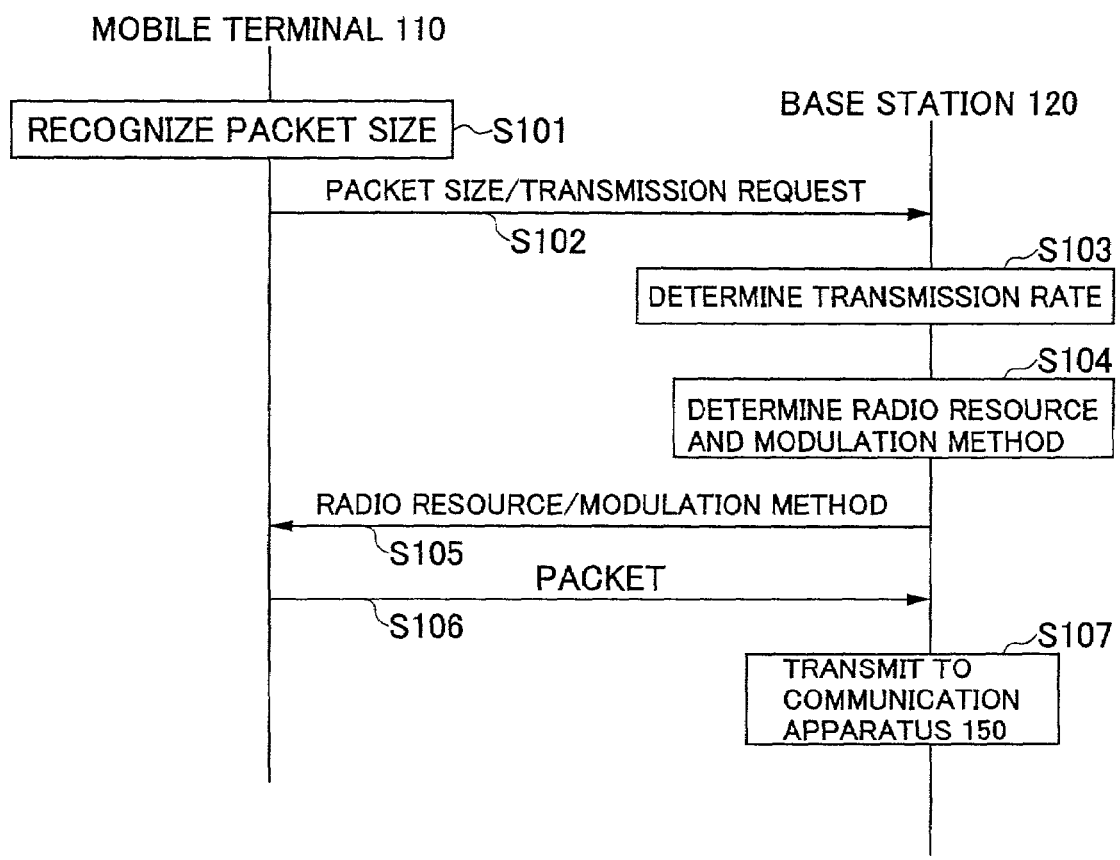
FIG. 5 is a flow diagram showing operations in a case where packets are transmitted from the mobile terminal to a communication apparatus in the reservation type access system according to the first embodiment.

FIG. 5 is a flow diagram showing the operations of the mobile terminal 110 and the base station 120 when packets are transmitted from the mobile terminal 110 to the communication apparatus 150 in the reservation type access system according to the first embodiment.

In step S101, the mobile terminal 110 recognizes the size of each of the packets to be transmitted. Next, in step S102, the mobile terminal 110 transmits the size of the packet and a transmission request to the base station 120.

In step S103, when the base station 120 receives the size of the packet and the transmission request from the mobile terminal 110, the base station 120 determines the transmission rate for the packet between the mobile terminal 110 and the base station 120 based on the size of the packet. Then, in step S104, the base station 120 determines a radio resource and a modulation method for each packet in accordance with the determined transmission rate. In step S105, information about the radio resource and the modulation method is transmitted to the mobile terminal 110.

In step S106, the mobile terminal 110 transmits the packet to be transmitted to the base station 120 in accordance with the radio resource and modulation method determined by the base station 120.

In step S107, the base station 120 transmits the packet from the mobile terminal 110 to the communication apparatus 150 via the RNC 130 and the communication network 140. Steps S101 through S107 are repeated until all of the packets to be transmitted are transmitted to the communication apparatus 150.

Figure 6:
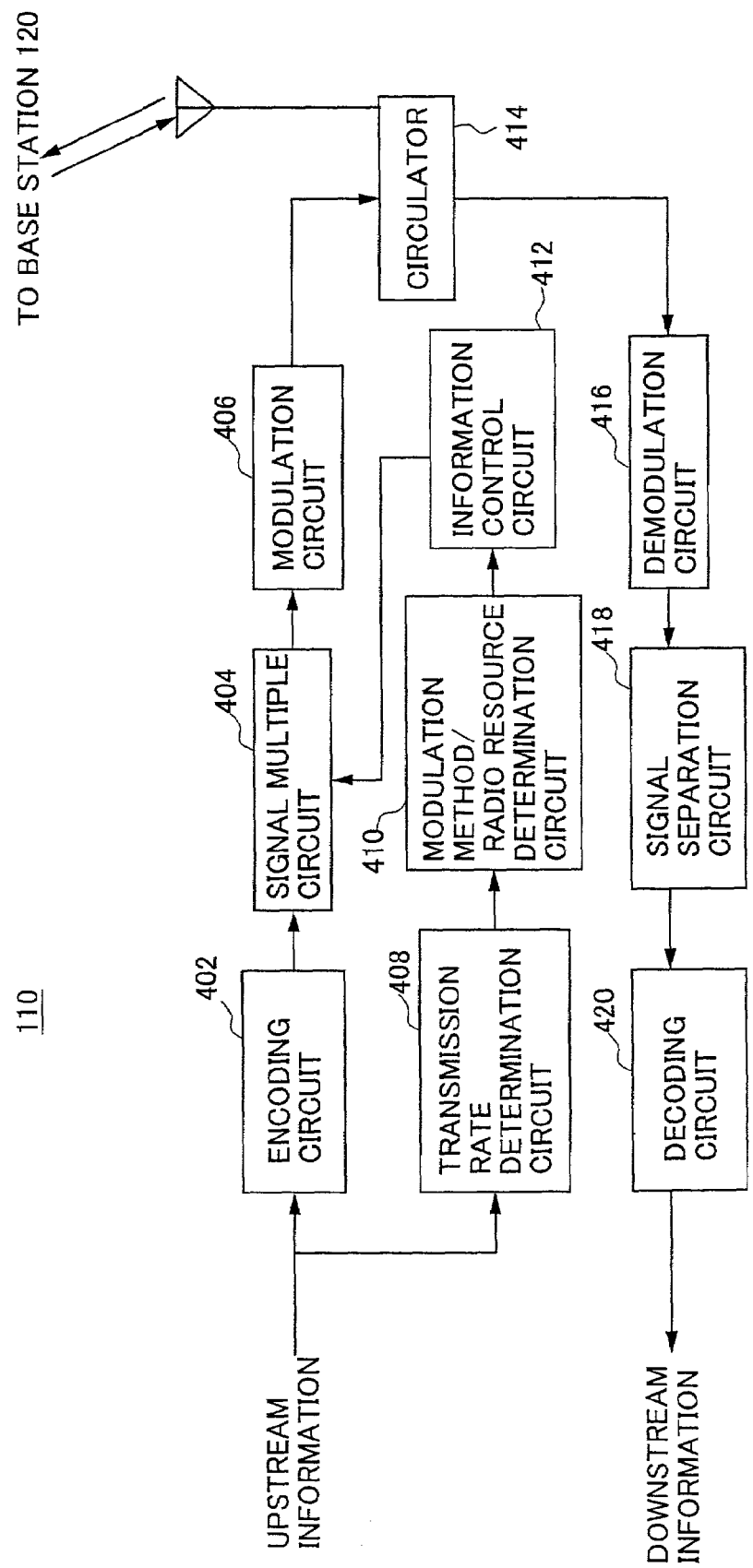
FIG. 6 is a block diagram showing an example of the structure of a mobile terminal in a non-reservation type access system according to the first embodiment.

FIG. 6 is a block diagram showing an example of the structure of the mobile terminal 110 in a non-reservation type access system according to the first embodiment of the present invention. As shown in FIG. 6, the mobile terminal 110 in the non-reservation type access system includes an encoding circuit 402, a signal multiple circuit 404, a modulation circuit 406, a transmission rate determination circuit 408, a modulation method/radio resource determination circuit 410 (referred to as "determination circuit 410", hereinafter), an information control circuit 412, a circulator 414, a demodulation circuit 416, a signal separation circuit 418 and a decoding circuit 420.

Figure 7:
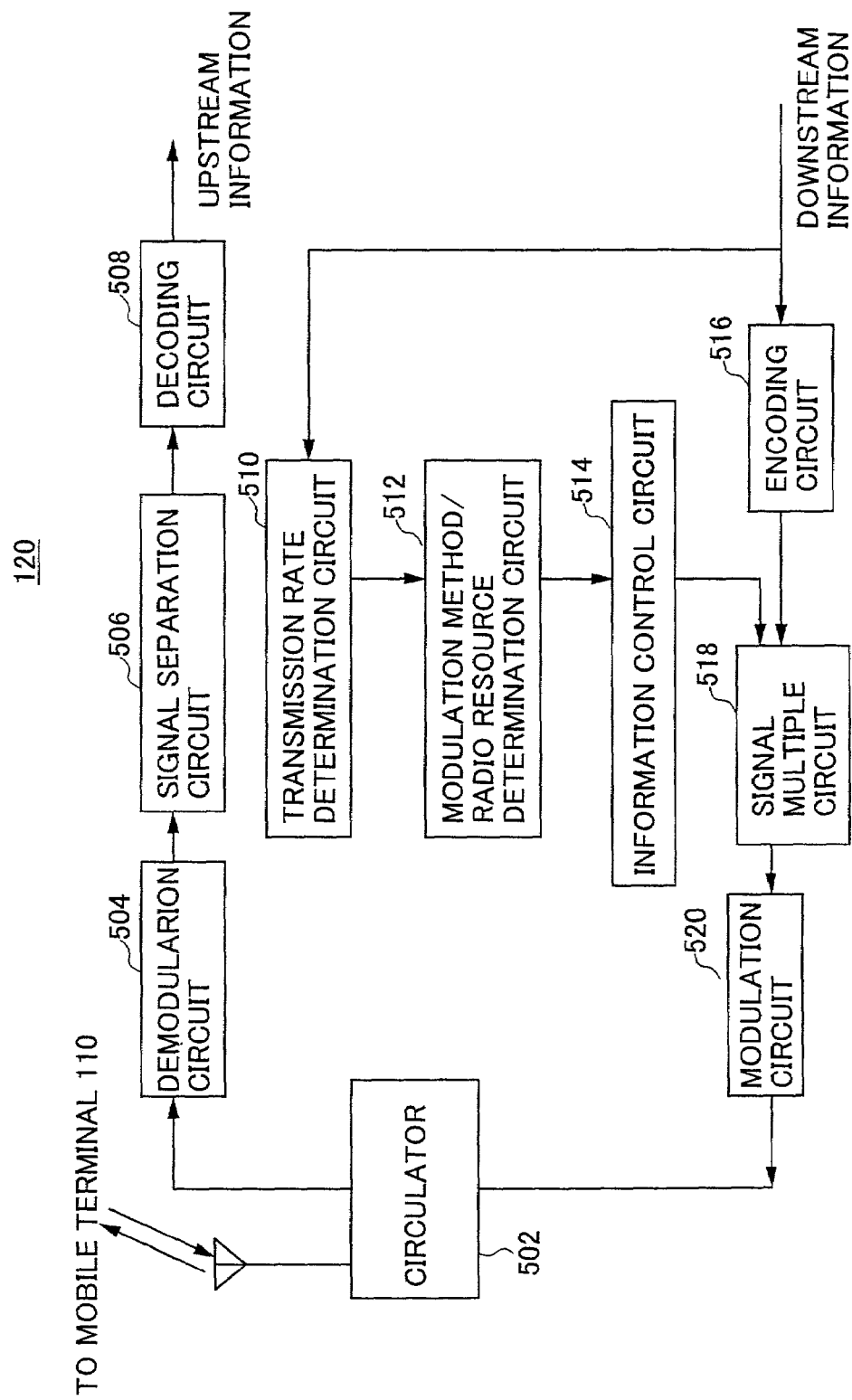
FIG. 7 is a block diagram showing an example of the structure of a base station in the non-reservation type access system according to the first embodiment.

Additionally, FIG. 7 is a block diagram showing an example of the structure of the base station 120 in the non-reservation type access system according to the first embodiment. As shown in FIG. 7, the base station 120 in the non-reservation type access system includes a circulator 502, a demodulation circuit 504, a signal separation circuit 506, a decoding circuit 508, a transmission rate determination circuit 510, a modulation method/radio resource determination circuit 512 (referred to as "determination circuit 512", hereinafter), an information control circuit 514, an encoding circuit 516, a signal multiple circuit 518, and a modulation circuit 520.

In the non-reservation type access system, when packets are transmitted from the mobile terminal 110 to the communication apparatus 150, the transmission rate determination circuit 408 of the mobile terminal 110 as shown in FIG. 6 recognizes the size of each of the packets to be transmitted.

The determination circuit 410 determines radio resource and modulation method in accordance with the transmission rate determined by the transmission rate determination circuit 408. To be specific, the determination circuit 410 determines the modulation method such as transmission power, and at the same time, a spread code that is a radio resource in accordance with the determined transmission rate when the CDMA system is employed in multiplexing. In addition, the determination circuit 410 determines a time slot that is a radio resource in accordance with the determined transmission rate when the TDMA system is employed in multiplexing. The determination circuit 410 determines a frequency band that is a radio resource in accordance with the determined transmission rate when the FDMA system is employed in multiplexing.

Information about the determined radio resource and modulation method is input to the signal multiple circuit 404 via the information control circuit 412. The signal multiple circuit 404 adds information about the radio resource and modulation method determined by the determination circuit 410 to each header of respective packets to be transmitted. The modulation circuit 406 modulates the packets to be transmitted and includes the headers in accordance with the respective radio resources and modulation methods determined by the determination circuit 410. The modulated packets are transmitted to the base station 120 via the circulator 414.

The packets that are to be transmitted and transmitted from the mobile terminal 110 are input to the signal separation circuit 506 via the circulator 502 and the demodulation circuit 504.

The signal separation circuit 506 separates information about the radio resource and the modulation method added to the headers of the input packets. The decoding circuit 508 decodes based on information about the radio resource and the modulation method that are separated by the signal separation circuit 506. The decoded signal is transmitted to as upstream information the communication apparatus 150 that is a receiver via the RNC 130 and the communication network 140.

Figure 8:
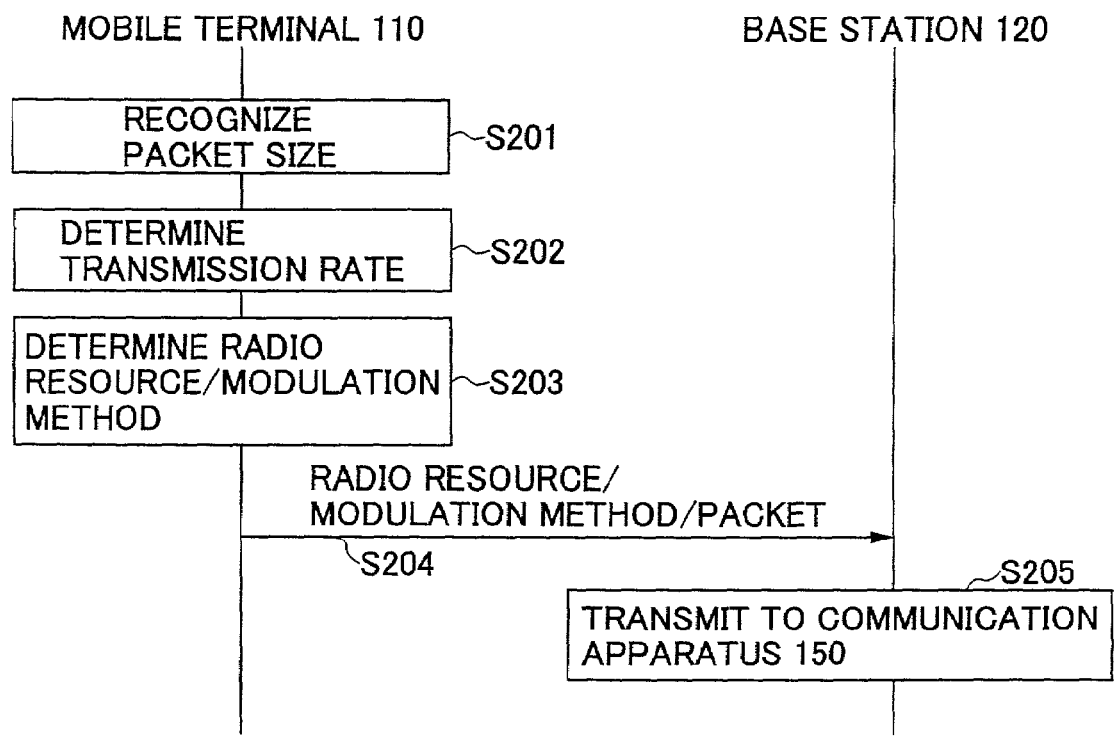
FIG. 8 is a flow diagram showing operations in a case where packets are transmitted from the mobile terminal to the communication apparatus in the non-reservation type access system according to the first embodiment.

FIG. 8 is a flow diagram showing the operations of the mobile terminal 110 and the base station 120 when packets are transmitted from the mobile terminal 110 to the communication apparatus 150 in the non-reservation type access system according to the first embodiment.

In step S201, the mobile terminal 110 recognizes the size of each of the packets to be transmitted. In step S202, the transmission rate is determined for the packet in accordance with the recognized size of the packet. Then, in step S203, the mobile terminal 110 determines a radio resource and a modulation method for the packet in accordance with the determined transmission rate.

In step S204, after the radio resource and the modulation method are determined, the mobile terminal 110 adds information about the determined radio resource and modulation method to a header of the packet to be transmitted. Thereafter, the mobile terminal 110 transmits the packet to the base station 120.

In step S205, the base station 120 decodes the packet transmitted from the mobile terminal 110 based on the information about the radio resource and the modulation method that is added to the header of the packet. Thereafter, the base station 120 transmits the decoded packet to the communication apparatus 150 that is a receiver via the RNC 130 and the communication network 140. Steps S201 through S205 are repeated until all of the packets to be transmitted are transmitted to the communication apparatus 150.

Next, a description will be given of a case where packets are transmitted from the communication apparatus 150 to the mobile terminal 110 in the first embodiment. In this case, the mobile terminal 110 performs the same operation whether the terminal 110 has the structure as shown in FIG. 2 or FIG. 6. Similarly, the base station 120 performs the same operation whether the base station 120 has the structure as shown in FIG. 3 or FIG. 7. Here, a description will be given of a case where the mobile terminal 110 has the structure as shown in FIG. 2 and the base station 120 has the structure as shown in FIG. 3.

The packets to be transmitted and transmitted from the communication apparatus 150 are input to the encoding circuit 316 included in the base station 120 via the communication network 140 and the RNC 130.

Additionally, the sizes of each of the packets to be transmitted are input to the transmission rate determination circuit 310 by the communication apparatus 150 via the communication network 140 and the RNC 130. The transmission rate determination circuit 310 recognizes the size of each of the packets to be transmitted, and determines the transmission rate for each packet in accordance with the size of the packet.

The determination circuit 312 determines a radio resource and a modulation method for each packet in accordance with the transmission rate that is determined by the transmission rate determination circuit 310. Information about the determined radio resource and modulation method is transmitted to the mobile terminal 110 via the information control circuit 314, the signal multiple circuit 318, the modulation circuit 320 and the circulator 302.

Thereafter, the packets to be transmitted are input to the modulation circuit 320 via the transmission rate determination circuit 310, the determination circuit 312, the information control circuit 314, and the signal multiple circuit 318. The modulation circuit 320 modulates the packets to be transmitted in accordance with the determined modulation method, and transmits the packets thereof to the mobile terminal 110 via the circulator 302.

At the mobile terminal 110, information about the radio resource and modulation method determined by the base station 120 is input to the decoding circuit 214 via the circulator 208, the modulation circuit 210, and the signal separation circuit 212. Subsequently, packets transmitted from the base station 120 are input to the decoding circuit 214 via the circulator 208, the modulation circuit 210, and the signal separation circuit 212. The decoding circuit 214 decodes the input packets in accordance with the information about the input radio resource and modulation method.

Figure 9:
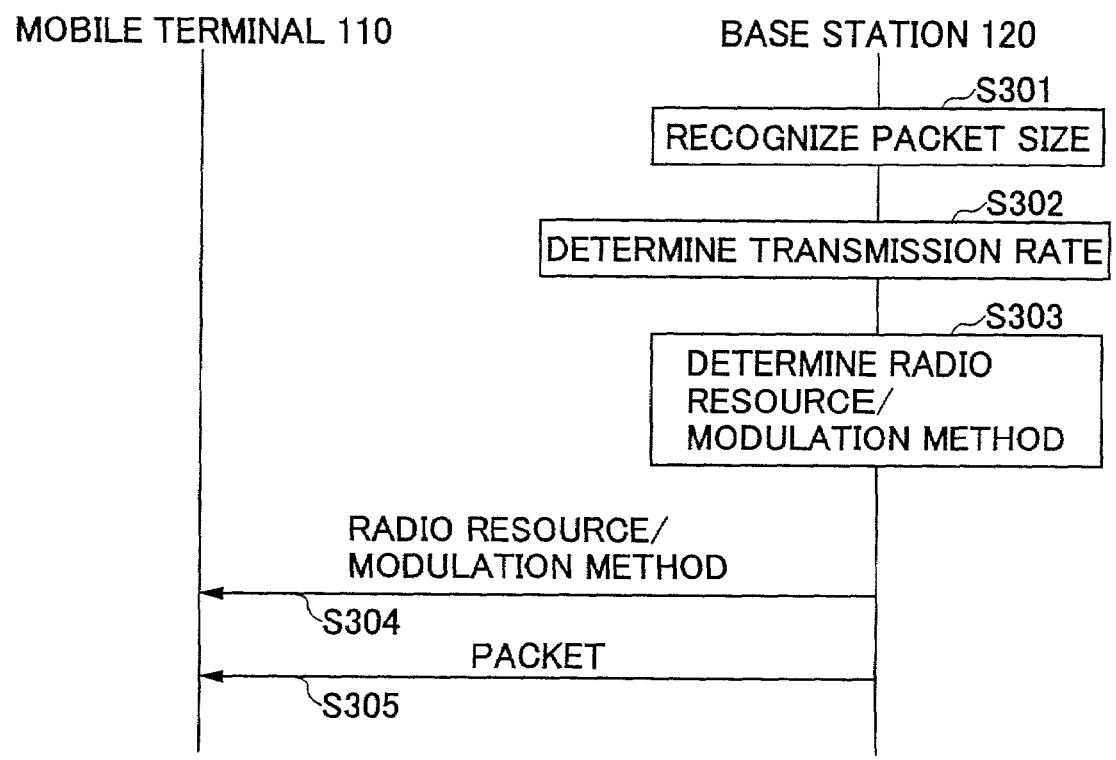
FIG. 9 is a flow diagram showing operations in a case where packets are transmitted from the communication apparatus to the mobile terminal according to the first embodiment.

FIG. 9 is a flow diagram showing the operations of the mobile terminal 110 and the base station 120 when packets are transmitted from the communication apparatus 150 to the mobile terminal 110 in the first embodiment.

In step S301, the base station 120 recognizes the size of each of the packets that are to be transmitted to the mobile terminal 110 and transmitted from the communication apparatus 150 via the communication network 140 and the RNC 130. In step S302, the base station 120 determines the transmission rate for the packet in accordance with the recognized size of the packet. Then, in step S303, the base station 120 determines a radio resource and a modulation method for the packet in accordance with the determined transmission rate.

Next, in step S304, the base station 120 transmits information about the determined radio resource and modulation method to the mobile terminal 110. The mobile terminal 110 receives the information.

Then, in step S305, the base station 120 transmits the packet to be transmitted to the mobile terminal 110. The mobile terminal 110 receives and decodes the packet in accordance with the information about the radio resource and modulation method that are received in step S304. Steps S301 through S305 are repeated until all of the packets to be transmitted are transmitted to the mobile terminal 110.

Next, a description will be given of a second embodiment of the present invention. In the second embodiment, a transmission rate for a packet between the mobile terminal 110 and the base station 120 is determined based on the size of each packet to be transmitted and a transmission condition required by a sender so as to satisfy the transmission condition.

Figure 10:
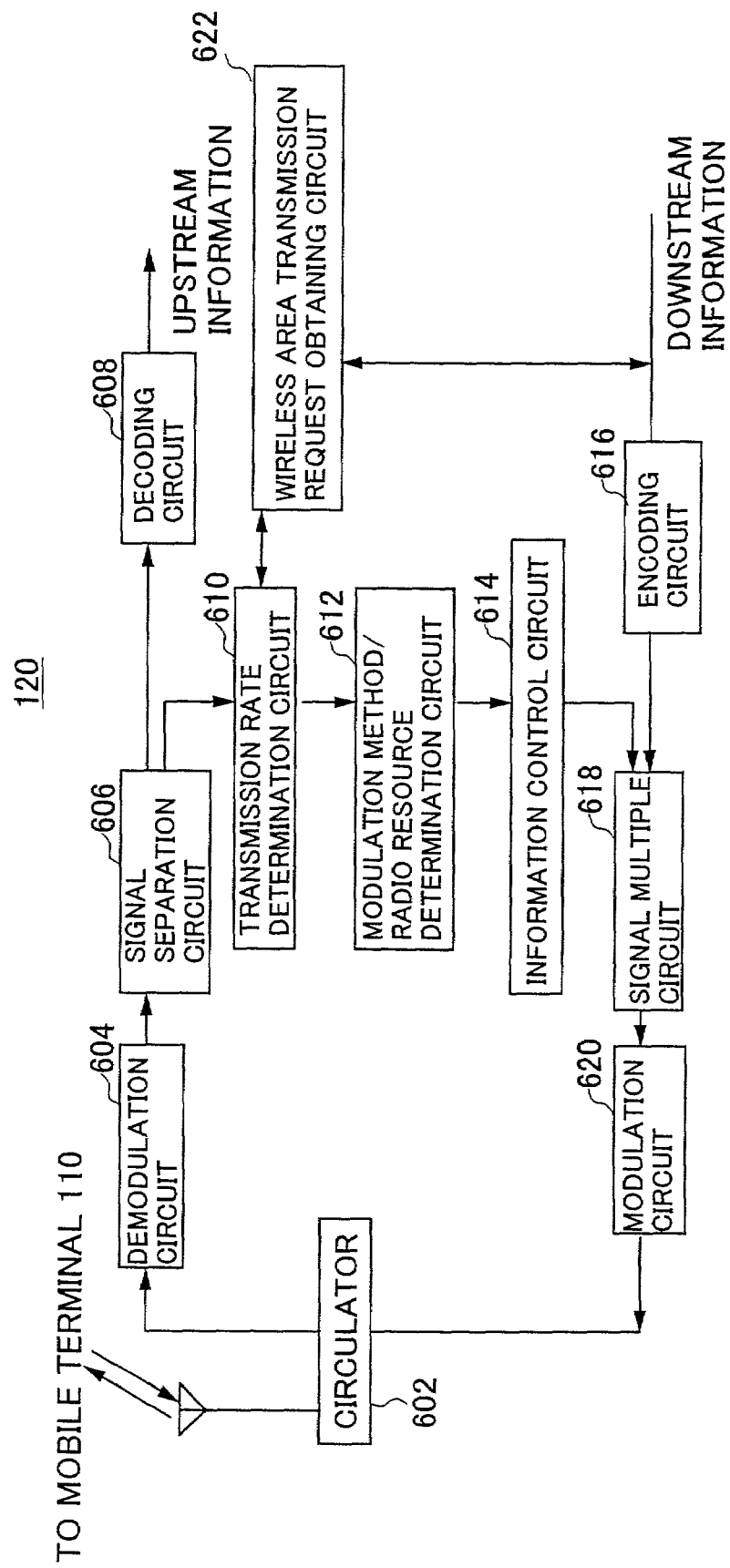
FIG. 10 is a block diagram showing an example of the structure of a base station according to a second embodiment of the present invention.

In this embodiment, the mobile terminal 110 has the structure as shown in FIG. 2. On the other hand, the base station 120 has the structure as shown in FIG. 10. As shown in FIG. 10, the base station 120 includes a circulator 602, a demodulation circuit 604, a signal separation circuit 606, a decoding circuit 608, a transmission rate determination circuit 610, a modulation method/radio resource determination circuit 612 (referred to as "determination circuit 612", hereinafter), an information control circuit 614, an encoding circuit 616, a signal multiple circuit 618, a modulation circuit 620, and a wireless area transmission request obtaining circuit 622 (referred to as "circuit 622", hereinafter).

In a case where packets are transmitted from the mobile terminal 110 to the communication apparatus 150, the mobile terminal 110 transmits the size of each of the packets to be transmitted and a transmission request to the base station 120.

More specifically, the packet size recognition part 202 in the mobile terminal 110 as shown in FIG. 2 recognizes the size of each of the packets to be transmitted. The size of the packet is transmitted to the base station 120 with the transmission request via the encoding circuit 204, the modulation circuit 206, and the circulator 208. In addition, the transmission request includes as a transmission condition transmission time of the packet from the mobile terminal 110 that is a sender to the communication apparatus 150 that is a receiver. The transmission time is determined depending on the type of information of a transmission target, for example.

The size of the packet and transmission request transmitted from the mobile terminal 110 are input to the transmission rate determination circuit 610 via the circulator 602, the demodulation circuit 604, and the signal separation circuit 606 included in the base station 120 as shown in FIG. 10. The transmission rate determination circuit 610 outputs the transmission request that is input to the circuit 622.

The circuit 622 recognizes a transmission state of the up direction (a direction from the base station 120 to the communication apparatus 150) of an upper network (here, the RNC 130 and the communication network 140). To be specific, the circuit 622 recognizes the transmission state of the upper network by inquiring of the RNC 130 or by estimating from a transmission state of the down direction (a direction from the communication apparatus 150 to the base station 120).

Next, the circuit 622 calculates transmission time of the packet from the mobile terminal 110 to the base station 120, that is, transmission time in a wireless area. The calculation is made based on transmission time of the packet from the mobile terminal 110 as a sender to the communication apparatus 150 as a receiver, the transmission time being included in the input transmission request, and the recognized transmission state of the up direction in the upper network. The calculated transmission time in the wireless area is input to the transmission rate determination circuit 610.

The transmission rate determination circuit 610 determines a transmission rate for the packet between the mobile terminal 110 and the base station 120 based on the size of the packet that is input and the transmission time in the wireless area so as to satisfy the transmission time thereof. More specifically, the transmission rate determination circuit 610 determines a transmission rate for the packet such that the transmission rate is higher as the size of the packet becomes larger.

The determination circuit 612 determines a modulation method and a radio resource for the packet in accordance with the transmission rate determined by the transmission rate determination circuit 610. Information about the determined radio resource and modulation method is transmitted to the mobile terminal 110 via the information control circuit 614, the signal multiple circuit 618, the modulation circuit 620, and the circulator 602.

At the mobile terminal 110, the information about the radio resource and modulation method determined by the base station 120 is input to the encoding circuit 204 via the circulator 208, the demodulation circuit 210, and the signal separation circuit 212. Subsequently, packets to be transmitted are modulated by the modulation circuit 206 in accordance with the respective radio resources and modulation methods determined by the base station 120, and transmitted to the base station 120 via the circulator 208.

The packets that are to be transmitted and transmitted from the mobile terminal 110 are input to the decoding circuit 608 via the circulator 602, the demodulation circuit 604, and the signal separation circuit 606 in the base station 120. The decoding circuit 608 decodes the packets to be transmitted and input to the decoding circuit 608. The decoded packets to be transmitted are transmitted as upstream information to the communication apparatus 150 that is a receiver via the RNC 130 and the communication network 140.

Figure 11:
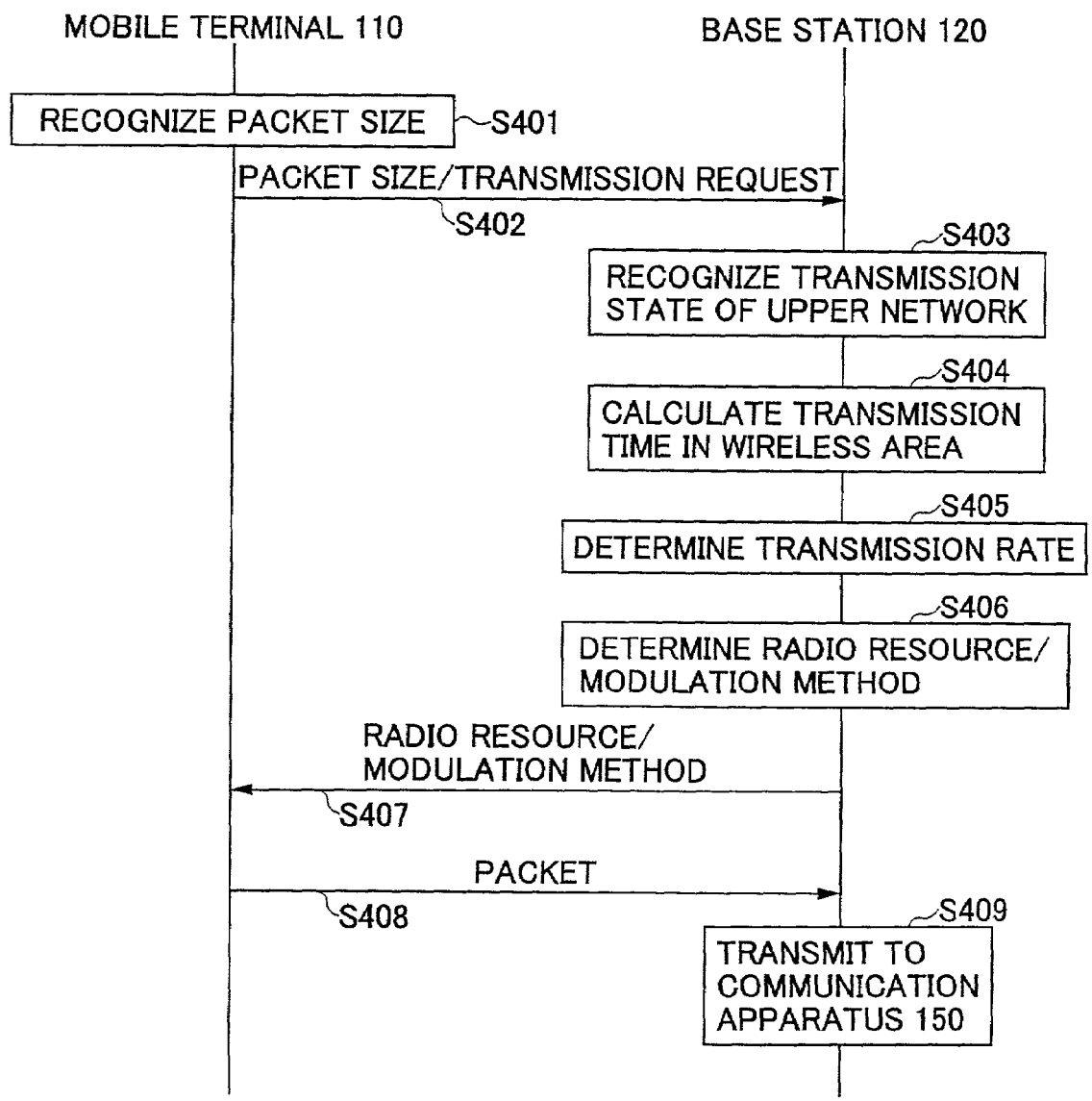
FIG. 11 is a flow diagram showing operations in a case where packets are transmitted from a mobile terminal to a communication apparatus according to the second embodiment.

FIG. 11 is a flow diagram showing the operations of the mobile terminal 110 and the base station 120 in a case where packets are transmitted from the mobile terminal 110 to the communication apparatus 150 in the second embodiment.

In step S401, the mobile terminal 110 recognizes the size of each of the packets to be transmitted. Next, in step S402, the mobile terminal 110 transmits to the base station 120 the size of the packet and a transmission request including transmission time of packet from the mobile terminal 110 that is a sender to the communication apparatus 150 that is a receiver as a transmission condition.

When the base station 120 receives the size of the packet and the transmission request from the mobile terminal 110, the base station 120 recognizes a transmission state of the upper network in step S403. In step S404, the base station 120 calculates transmission time in the wireless area. The calculation is made based on transmission time of the packet from the mobile terminal 110 (sender) to the communication apparatus 150 (receiver), the transmission time being included in the input transmission request, and the recognized transmission state of the up direction in the upper network.

Next, in step S405, the base station 120 determines a transmission rate for the packet between the mobile terminal 110 and the base station 120 based on the input size of the packet and the calculated transmission time in the wireless area so as to satisfy the transmission time.

Then, in step S406, the base station 120 determines a radio resource and a modulation method for the packet in accordance with the determined transmission rate. In step S407, the base station 120 transmits to the mobile terminal 110 information about the radio resource and the modulation method.

In step S408, the mobile terminal 110 transmits to the base station 120 the packet to be transmitted in accordance with the radio resource and modulation method determined by the base station 120.

In step S409, the base station 120 transmits to the communication apparatus 150 that is a receiver the packet transmitted from the mobile terminal 110 via the RNC 130 and the communication network 140. Steps S401 through S409 are repeated until all of the packets to be transmitted are transmitted to the communication apparatus 150.

Next, a description will be given of a case where packets are transmitted from the communication apparatus 150 to the mobile terminal 110 according to the second embodiment.

The packets that are to be transmitted and transmitted from the communication apparatus 150 are input to the encoding circuit 616 in the base station 120 as shown in FIG. 10 via the communication network 140 and the RNC 130.

Additionally, the transmission request and the size of the packet transmitted from the communication apparatus 150 are input to the circuit 622 via the communication network 140 and the RNC 130. The transmission request includes transmission time of the packet from the communication apparatus 150 to the mobile terminal 110 asa transmission condition. At the same time, the transmission request also includes time when the communication apparatus 150 started transmitting the packet.

Alternatively, the circuit 622 receives the size of the packet that is to be transmitted and transmitted from the communication apparatus 150 and a transmission request from the RNC 130. The transmission request includes, as a transmission condition, transmission time of the packet from the base station 120 to the mobile terminal 110, that is, transmission time in the wireless area. The transmission time in the wireless area is calculated by the RNC 130. The calculation is made by subtracting time required for transmitting the packet from the communication apparatus 150 to the base station 120 from the transmission time of the packet from the communication apparatus 150 to the mobile terminal 110, the transmission time being included in the transmission request transmitted from the communication apparatus 150.

The circuit 622 calculates transmission time in the wireless area in a case where the circuit 622 receives a transmission request and the size of the packet to be transmitted from the communication apparatus 150 via the communication network 140 and the RNC 130. To be specific, the circuit 622 calculates the transmission time in the wireless area by subtracting a difference between the present time and the time when the communication apparatus 150 started transmitting the packet from the transmission time of the packet from the communication apparatus 150 to the mobile terminal 110, the transmission time being included in the transmission request.

The calculated transmission time in the wireless area is input to the transmission rate determination circuit 610 with the size of the packet.

On the other hand, when the circuit 622 receives the transmission request from the RNC 130 and the size of the packet that is to be transmitted and transmitted from the communication apparatus 150, the circuit 622 directly outputs the transmission request and the size of the packet to the transmission rate determination circuit 610.

The transmission rate determination circuit 610 determines a transmission rate for the packet between the mobile terminal 110 and the base station 120 based on the size of the packet and the transmission time in the wireless area that are input so as to satisfy the transmission time thereof. More specifically, the transmission rate determination circuit 610 determines the transmission rate for the packet such that the transmission rate becomes higher as the size of the packet becomes larger.

The determination circuit 612 determines a radio resource and a modulation method for the packet in accordance with the transmission rate determined by the transmission rate determination circuit 610. Information about the determined radio resource and modulation method is transmitted to the mobile terminal 110 via the information control circuit 614, the signal multiple circuit 618, the modulation circuit 620, and the circulator 602.

Then, the packet to be transmitted is input to the modulation circuit 620 from the encoding circuit 616 via the signal multiple circuit 618. The modulation circuit 620 modulates the packet to be transmitted in accordance with the determined modulation method. The modulated packet is transmitted to the mobile terminal 110 from the modulation circuit 620 via the circulator 602.

At the mobile terminal 110, the information about the radio resource and modulation method determined by the base station 120 is input to the decoding circuit 214 via the circulator 208, the demodulation circuit 210, and the signal separation circuit 212. Subsequently, a packet that is to be transmitted and transmitted from the base station 120 is input to the decoding circuit 214 via the circulator 208, the demodulation circuit 210, and the signal separation circuit 212. The decoding circuit 214 decodes the input packet to be transmitted in accordance with the input information about the radio resource and modulation method.

Figure 12:
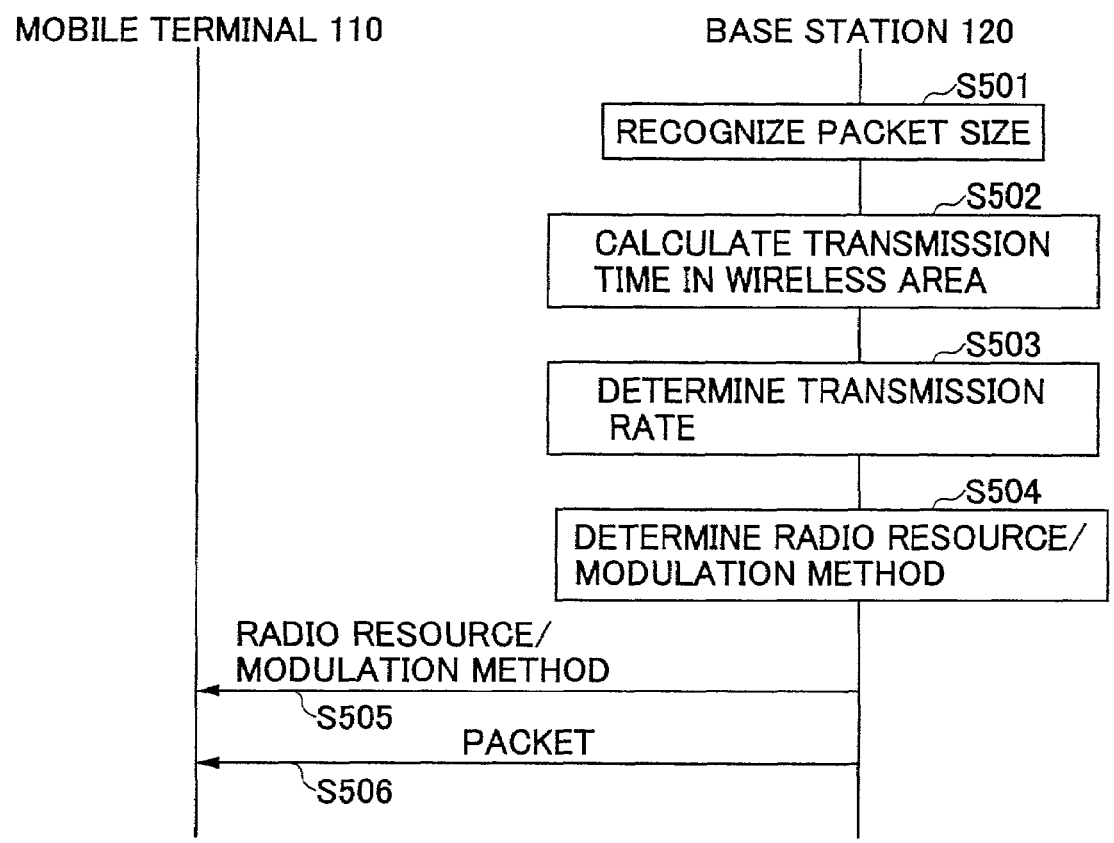
FIG. 12 is a flow diagram showing operations in a case where packets are transmitted from the communication apparatus to the mobile terminal according to the second embodiment.

FIG. 12 is a flow diagram showing the operations of the mobile terminal 110 and the base station 120 in a case where packets are transmitted from the communication apparatus 150 to the mobile terminal 110 according to the second embodiment.

In step S501, the base station 120 recognizes the size of the packet to be transmitted when the packet, the size of the packet, and a transmission request are input from the communication apparatus 150. Then, in step S502, the base station 120 calculates transmission time in the wireless area. The calculation is made by subtracting a difference between the present time and the time when the communication apparatus 150 started transmitting the packet from the transmission time of the packet from the communication apparatus 150 to the mobile terminal 110. The transmission time is included in the transmission request. Alternatively, the base station 120 recognizes a request from the upper network for the transmission time in the wireless area.

Next, in step S503, the base station 120 determines a transmission rate for the packet between the mobile terminal 110 and the base station 120 based on the size of the packet to be transmitted and the calculated or recognized transmission time in the wireless area so as to satisfy the transmission time thereof. In step S504, the base station 120 determines a radio resource and a modulation method for the packet in accordance with the determined transmission rate.

Next, in step S505, the base station 120 transmits information about the determined radio resource and modulation method to the mobile terminal 110. The mobile terminal 110 receives the information.

Thereafter, in step S506, the base station 120 transmits the packet to be transmitted to the mobile terminal 110. The mobile terminal 110 receives the packet, and decodes the received packet in accordance with the information about the radio resource and modulation method that is received in step S505. Steps S501 through S506 are repeated until all of the packets to be transmitted are transmitted to the mobile terminal 110.

As mentioned above, in the mobile communication system 100 according to this embodiment, when packet transmission is performed between the mobile terminal 110 and the communication apparatus 150, the transmission rate between the mobile terminal 110 and the base station 120 is determined in accordance with the size of the packet to be transmitted. Additionally, when a transmission condition between the mobile terminal 110 and the communication apparatus 150, or a transmission condition between the mobile terminal 110 and the base station 120 is specified, the transmission rate is determined so as to satisfy the transmission condition. Therefore, it is possible to decrease variation of packet transmission time from a sender to a receiver irrespective of the sizes of packets to be transmitted.

In addition, since the transmission rate is determined so as to satisfy the transmission condition between the mobile terminal 110 as a sender and the communication apparatus 150 as a receiver, when transmission quality from the sender to the receiver, that is, end-to-end transmission quality is required, it is possible to meet the requirement.

Additionally, in another embodiment of the present invention, end-to-end quality of service (QoS) can be supported by determining a modulation method or a radio resource by calculating a transmission rate in the wireless area in accordance with the size of each packet and a transmission request therein. When packets are transmitted downward, the base-station 120 recognizes the transmission request in the wireless area from the upper network. When packets are transmitted upward, the base station 120 calculates the transmission request in the wireless area based on a request from a user (mobile station) and a transmission state of the upper network.

Thus, when packets are transmitted downward, the optimum transmission rate is determined in accordance with the size of each packet and the transmission request in the wireless area from the upper network. When packets are transmitted upward, the transmission request in the wireless area is calculated in accordance with the quality of service request of the user and the transmission state of the upper network. Accordingly, it is possible to improve the system capacity and to maximize end-to-end quality of service by setting an optimum transmission rate.

In each of the above-mentioned embodiments, the packet size recognition part 202 and the transmission rate determination circuit 408 in the mobile terminal 110 correspond to a packet size recognition part. Also, the transmission rate determination circuits 310, 510 and 610 in the base station 120 correspond to the packet size recognition part. Each of the transmission rate determination circuit 408 in the mobile terminal 110, the transmission rate determination circuits 310, 510 and 610 in the base station 120 corresponds to a transmission rate determination part.

Further, each of the determination circuit 410 in the mobile terminal 110, and the determination circuits 312, 512 and 612 in the base station 120 corresponds to a radio resource allocation part. Each of the whole mobile terminal 110 and the whole base station 120 corresponds to a packet transmission part.

Additionally, the transmission rate determination circuit 610 in the base station 120 corresponds to a first obtaining part that obtains a transmission condition. The circuit 622 corresponds to a second obtaining part and a third obtaining part each of which obtains a transmission condition.

Furthermore, the transmission rate determination circuit 408 in the mobile terminal 110 corresponds to a transmission rate notification part. The packet size recognition part 202 in the mobile terminal 110 corresponds to a packet size notification part.

The present invention is not limited to the specifically disclosed embodiments, and variations and modifications may be made without departing from the scope of the present invention.

The present application is based on Japanese Priority Application No. 2001-183393 filed on Jun. 18, 2001, the entire contents of which are hereby incorporated by reference.

What is claimed is:

1. A packet transmission method in which a plurality of packets having headers and different sizes are transmitted between a mobile station and a communication device via a base station communicating with said mobile station and connected to communication device through a network, comprising the steps of, for each packet:
    in the mobile station,
        recognizing the size of each packet to be transmitted;
        determining a transmission time of the packet between the mobile station and the base station calculated from a transmission condition for the transmission time of the packet between the mobile station and the communication device;
        determining a transmission rate for each packet based on the recognized size of said packet and on the determined transmission time so that the transmission rate is higher as the recognized size of the packet is larger;
        notifying the base station of the determined transmission rate;
    in the base station,
        allocating a radio resource for the transmission of the packet between the base station and the mobile station based on said transmission rate received from the mobile station;
        transmitting the packet between the base station and the mobile station using said allocated radio resource such that variations of the transmission time of the packet between the mobile station and a communication device are reduced.

2. The packet transmission method as claimed in claim 1, wherein when the packet is transmitted from the mobile station as a sender to a receiver via the base station, the transmission rate is determined based on the size of the packet to be transmitted and a transmission state of an upper network of the base station so as to satisfy a transmission condition between the mobile station and the receiver.

3. The packet transmission method as claimed in claim 2, wherein the transmission condition between the mobile station and the receiver includes transmission time of the packet from the mobile station to the receiver.

4. The packet transmission method as claimed in claim 1, wherein when the packet is transmitted from a sender to the mobile station as a receiver via the base station, the transmission rate is determined in accordance with the size of the packet so as to satisfy a transmission condition between the base station and the mobile station.

5. The packet transmission method as claimed in claim 4, wherein the transmission condition between the base station and the mobile station includes transmission time of the packet from the base station to the mobile station.

6. The packet transmission method as claimed in claim 1, wherein when the packet is transmitted from a sender to the mobile station as a receiver via the base station, the transmission rate is determined in accordance with the size of the packet to be transmitted so as to satisfy a transmission condition between the sender and the mobile station.

7. The packet transmission method as claimed in claim 6, wherein the transmission condition between the sender and the mobile station includes transmission time of the packet from the sender to the mobile station.

8. A base station that transmits and receives a plurality of packets having headers and different sizes between a communication device and a mobile station communicating via the base station through a network, comprising:
   a transmission determination part that determines a transmission time of the packet between the mobile station and the base station calculated from a transmission condition for the transmission time of the packet between the mobile station and the communication device;
   a transmission rate receiving part that receives a transmission rate from the mobile station, the transmission rate being between the base station and the mobile station and based on the recognized sizes of the respective packets and the transmission time of the packet between the mobile station and the base station so that the transmission rate is higher as the recognized size of the packet is larger;
   a radio resource allocation part that allocates a radio resource and modulation method for transmission of each packet between the base station and the mobile station based on the determined transmission rate; and
   a packet transmission part that transmits each packet between the base station and the mobile station using the allocated radio resource such that variations of a transmission time of the packet between the mobile station an indication device are reduced.

9. The base station as claimed in claim 8, wherein when the packet is transmitted from the mobile station as a sender to a receiver via the base station, the transmission rate determination part determines the transmission rate in accordance with the size of the packet to be transmitted and a transmission state of an upper network of the base station so as to satisfy a transmission condition between the mobile station and the receiver.

10. The base station as claimed in claim 9, further comprising:
   a first obtaining part that obtains the transmission condition provided from the mobile station.

11. The base station as claimed in claim 9, wherein the transmission condition includes transmission time of the packet from the mobile station to the receiver.

12. The base station as claimed in claim 8, wherein when the packet is transmitted from a sender to the mobile station as a receiver via the base station, the transmission rate determination part determines the transmission rate in accordance with the size of the packet to be transmitted so as to satisfy a transmission condition between the base station and the mobile station.

13. The base station as claimed in claim 12, further comprising:
   a second obtaining part that obtains the transmission condition provided from an upper network.

14. The base station as claimed in claim 12, wherein the transmission condition includes transmission time of the packet from the base station to the mobile station.

15. The base station as claimed in claim 8, wherein when the packet is transmitted from a sender to the mobile station as a receiver via the base station, the transmission rate determination part determines the transmission rate in accordance with the size of the packet to be transmitted so as to satisfy a transmission condition between the sender and the mobile station.

16. The base station as claimed in claim 15, further comprising:
   a third obtaining part that obtains the transmission condition provided from an upper network.

17. The base station as claimed in claim 15, wherein the transmission condition includes transmission time of the packet from the sender to the mobile station.

18. A mobile station that exchanges a plurality of packets having headers and different sizes between said mobile station and a communication device via a base station commuting with said mobile station and connected to the communication device through a network, comprising:
   a recognition part that recognizes the size of each packet to be transmitted and information contained in the header of each packet that describes a radio resource and modulation method specified by the base station;
   a transmission time determination part that determines a transmission time of the packet between the mobile station and the base station calculated from a transmission condition for the transmission time of the packet between the mobile station and the communication device;
   a transmission rate determination part that determines a transmission rate of each packet between the mobile station and said base station based on the recognized size of each packet and the transmission time so that the transmission rate is higher as the recognized size of the packet is larger;
   a transmission rate notification part that notifies the base station of the determined transmission rate for each packet; and
   a packet transmission part that transmits each packet between the mobile station and the base station using the radio resource allocated by and modulation method specified by the base station based on the notified transmission rate for each packet such that variations of the transmission time of the packet between the mobile station and a communication device are reduced.

19. A mobile station that exchanges a plurality of packets of different sizes between said mobile station and a base station, said packets having headers comprising:
   a recognition part that recognizes the size of each packet to be transmitted and information contained in the header of each packet that describes a radio resource and modulation method specified by the base station;
   a packet size notification part that notifies the base station of the recognized size of each packet;
   a transmission time determination part that determines a transmission time of the packet between the mobile station and the base station calculated from a transmission condition for the transmission time of the packet between the mobile station and the communication device; and
   a packet transmission part that transmits each packet between the mobile station and the base station using the radio resource and modulation method specified by the base station based on a transmission rate, which is determined based on the size of each packet and the transmission time so that the transmission rate is higher as the recognized size of said packet is larger such that variation of transmission times of the packets having different sizes between the communication device and the mobile station are reduced.

20. The mobile station as claimed in claim 19, further comprising:
a transmission condition notification part that notifies the base station of a transmission condition between the mobile station as a sender and a receiver,
wherein when the packet is transmitted from the mobile station to the receiver via the base station, the transmission rate is determined so as to satisfy the transmission condition.

21. The mobile station as claimed in claim 20, wherein the transmission condition includes transmission time of the packet from the mobile station to the receiver.

22. A packet transmission method in which a plurality of packets having headers and different sizes are transmitted between a mobile station and a communication device via a base station communicating with said mobile station and connected to communication device through a network, comprising the steps of, for each packet:
in the mobile station,
recognizing the size of each packet to be transmitted;
notifying the base station of the recognized packet size;
in the base station,
determining a transmission time of the packet between the mobile station and the base station calculated from a transmission condition for the transmission time of the packet between the mobile station and the communication device;
determining a transmission rate for each packet based on the recognized size of each packet provided by the mobile station and on the determined transmission time so that the transmission rate is higher as the recognized size of the packet is larger;
allocating a radio resource for the transmission of the packet between the base station and the mobile station based on the determined transmission rate;
transmitting the packet between the base station and the mobile station using said allocated radio resource such that variations of the transmission time of the packet between the mobile station and the communication device are reduced.

23. A base station that transmits and receives a plurality of packets having headers and different sizes between a communication device and a mobile station communicating via the base station through a network, comprising:
a packet size receiving part that receives the size of each packet to be transmitted from the mobile station;
a transmission time determination part that determines a transmission time of the packet between the mobile station and the base station calculated from a transmission condition for the transmission time of the packet between the mobile station and the communication device;
a transmission rate determination part that determines a transmission rate between the base station and the mobile station and based on the packet size received from the mobile station and the determined transmission time of the packet between the mobile station and the base station so that the transmission rate is higher as the recognized size of the packet is larger;
a radio resource allocation part that allocates a radio resource and modulation method for transmission of each packet between the base station and the mobile station based on the determined transmission rate; and
a packet transmission part that transmits each packet between the base station and the mobile station using the allocated radio resource such that variations of a transmission time of the packet between the mobile station and the communication device are reduced.

24. A mobile station that exchanges a plurality of packets having headers and different sizes between said mobile station and a communication device via a base station commuting with said mobile station and connected to the communication device through a network, comprising:
a recognition part that recognizes the size of each packet to be transmitted;
a packet size notification part that notifies the base station of the determined packet size for each packet;
a transmission determination part that determines a transmission time of the packet between the mobile station and the base station calculated from a transmission condition for the transmission time of the packet between the mobile station and the communication device; and
a packet transmission part that transmits each packet between the mobile station and the base station using a radio resource allocated by the base station and transmission rate specified by the base station, the transmission rate based on the packet size received from the mobile station and the transmission time of the packet between the mobile station and the base station, such that variations of the transmission time of the packet between the mobile station and the communication device are reduced.

25. A packet transmission method in which a plurality of packets having headers and different sizes are transmitted between a mobile station and a communication device via a base station communicating with said mobile station and connected to communication device through a network, comprising the steps of, for each packet:
in the base station,
recognizing the size of each packet to be transmitted;
determining a transmission time of the packet between the mobile station and the base station calculated from a transmission condition for the transmission time of the packet between the mobile station and the communication device;
determining a transmission rate for each packet based on the recognized size of each packet and on the determined transmission time so that the transmission rate is higher as the recognized size of the packet is larger;
allocating a radio resource for the transmission of the packet between the base station and the mobile station based on said determined transmission rate; and
transmitting the packet between the base station and the mobile station using said allocated radio resource such that variations of the transmission time of the packet between the mobile station and the communication device are reduced.

26. A base station that transmits and receives a plurality of packets having headers and different sizes between a communication device and a mobile station communicating via the base station through a network, comprising:
a packet size recognizing part that recognizes the size of each packet to be transmitted;
a transmission time determination part that determines a transmission time of the packet between the mobile station and the base station calculated from a transmission condition for the transmission time of the packet between the mobile station and the communication device;
a transmission rate determination part that determines a transmission rate between the base station and the mobile station and based on the recognized size of the packet and the determined transmission time of the packet between the mobile station and the base station so that the transmission rate is higher as the recognized size of the packet is larger;

a radio resource allocation part that allocates a radio resource and modulation method for transmission of each packet between the base station and the mobile station based on the determined transmission rate; and a packet transmission part that transmits each packet between the base station and the mobile station using the allocated radio resource such that variations of a transmission time of the packet between the mobile station and the communication device are reduced.

* * * * *